United States Patent [19]

Straumsnes

[11] 3,928,771
[45] Dec. 23, 1975

[54] WATER CURRENT POWER GENERATOR SYSTEM

[76] Inventor: O. Robert Straumsnes, One Bryant Crescent, White Plains, N.Y. 10602

[22] Filed: Apr. 5, 1974

[21] Appl. No.: 458,228

[52] U.S. Cl. .................... 290/43; 290/43; 290/54; 114/.5
[51] Int. Cl.² ........................................ F03B 13/10
[58] Field of Search ............ 290/42, 43, 44, 53, 54; 415/5; 416/7; 115/.5 R; 114/.5 R X

[56] References Cited
UNITED STATES PATENTS

| | | | |
|---|---|---|---|
| 402,055 | 4/1889 | Besemer ................................ | 415/5 |
| 749,625 | 1/1904 | McIntyre ............................... | 415/5 |
| 867,459 | 10/1907 | Willard ................................. | 290/43 |
| 968,904 | 8/1910 | Warren ................................. | 290/43 |
| 1,449,426 | 3/1923 | Loveless et al. ...................... | 415/5 |
| 1,542,252 | 6/1925 | Kimple ................................. | 415/5 |
| 1,811,565 | 6/1931 | Schwabacher ...................... | 290/53 |
| 2,161,215 | 6/1939 | Wise ................................... | 415/5 |

*Primary Examiner*—G. R. Simmons
*Attorney, Agent, or Firm*—Martin J. Spellman, Jr.

[57] ABSTRACT

A water current power generator system comprises one or more generator ships firmly anchored to the water bottom to generate power from sea currents or the tidal flow of rivers. The hull of a typical ship includes an inlet where the moving water enters and drives blades hinged to a toothed belt which moves about a pair of rollers. As the blades move about the forward roller, the hinged blades are driven outwardly to a right angle position to be driven by the water flow. The blades fold into a collapsed position as they pass over the rear roller and move in a direction opposite the water flow thereby minimizing resistance to the water flow. Generally, a pair of toothed belts are provided within each shaped inlet with a thrust member therebetween to direct the water towards the blades. The belts are mounted vertically within the hull to encounter as much of the water pressure as possible. The water then flows out the rear of the hull through a shaped outlet which is smaller than the inlet. In an alternate embodiment, vertical water wheels with collapsible blades are used instead of toothed belts. This variation would include at least one of such wheels positioned at the inlet and having hinged members serving as blades mounted on the wheels to catch the water flow thereby driving the wheel. The blade would then pivot to an open position minimizing resistance to the motion of the wheel as it moves around the axis of said wheel.

2 Claims, 7 Drawing Figures

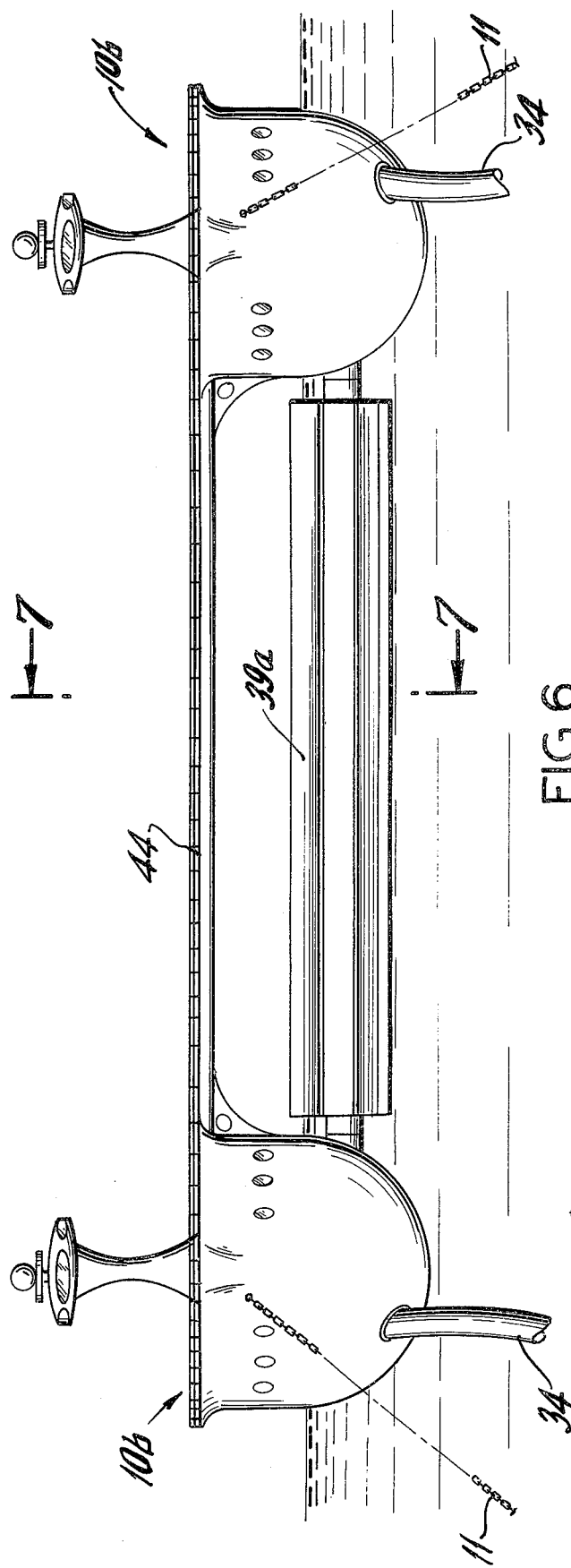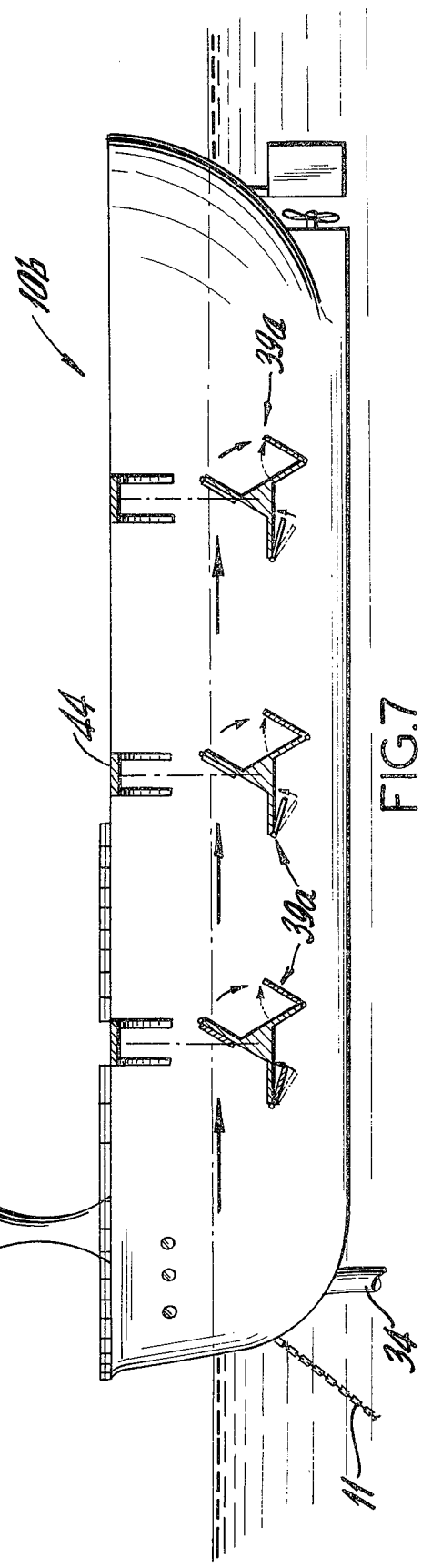

WATER CURRENT POWER GENERATOR SYSTEM

BACKGROUND OF THE INVENTION

The present invention relates to power generating means and particularly to a water current power generator system.

The power crisis faced by many nations in general and the industrial nations in particular has caused increased emphasis to be placed on the search for energy, while at the same time, the awareness of environmental damage limits the scope or the alternatives for energy producing plants. Heretofore, the utilization of the sea currents and the tidal flow of rivers and other bodies of water has not been taken in consideration seriously as an energy source to generate electric power. It remains a fact that sea currents like the Gulf Stream potentially could generate millions of kilowatts of clean energy since the current speeds reach approximately 3 knots with the volume of transport being $57 \times 10^6$ m$^3$/sec. which is about 65 times greater than all the rivers in the world. Thus a vast source of clean power remains to be exploited.

Among the more pertinent prior art patents are U.S. Pat. No. 1,687,923 to C. J. Baer which discloses a current motor wherein the generating means is almost entirely above the surface of the water and wherein holes are provided in the blades to permit the water to pass therethrough. Another reference of interest is U.S. Pat. No. 1,707,795 to M. M. Brown which discloses a current motor including a cable-type conveyor belt and a chain to hold the blades in position. The entire apparatus is situated under water and would not appear useful for offshore installations.

Other patents of general interest include U.S. Pat. Nos. 1,556,876 to G. Ortgier and 2,428,515 to Courson. The above patents are merely intended to be representative of the relevant prior art in the area of the present invention and are not intended to be an all-inclusive list of such prior art.

SUMMARY OF THE INVENTION

The present invention relates to a water current power generating system comprising one or more generator ships firmly anchored to the sea floor wherein said ships each include a shaped inlet and a shaped outlet for water currents. Mounted within the inlet and extending along a substantial lengthwise portion of the shaped hull is a toothed belt running about a pair of rollers. A plurality of shaped blades are mounted against blocks and hinged to the belt so that the blades stand outwardly against the blocks while being driven by the water flow and then pivot in the opposite direction during the return trip to the forward portion of the belt to thereby minimize water resistance. A thrust member may be positioned between two of said belts to direct the water flow to said blades.

An alternate embodiment of the invention comprises a pair of vertical water wheels having hinged blade members which are driven by the water in opposite directions and pivot about their fixed position as they rotate in order to minimize water resistance. The driven members in both embodiments are connected to conventional power generating means whereby the motion of said water is converted into electrical energy.

The object of this invention is to provide a new and improved water current power generator system.

Another object of the invention is to provide new and improved power generator means wherein water currents or tidal flow are used to drive one or more belt members of a unique design.

A further object of this invention is to provide a new and improved power generator means wherein water currents or tidal flow are used to drive one or more water wheels of a unique design.

A more specific object of this invention is to provide a unique power generator means for utilizing sea currents and tidal flow as an energy source to provide a readily available cheap source of energy without the problems of environmental damage normally associated with power plants.

BRIEF DESCRIPTION OF THE DRAWINGS

Other objects and advantages of the present invention may be more clearly seen when viewed in conjunction with the accompanying drawings wherein:

FIG. 6 discloses a front view showing a catamaran design for the generator ship with the water wheels in a horizontal arrangement, and;

FIG. 7 discloses a longitudinal-sectional view of the generator ship of FIG. 6 through the center of ship looking starboard, taken along lines 7—7 of FIG. 6 and having a plurality of rotating generating means mounted therein.

DETAILED DESCRIPTION OF THE INVENTION

Figure 1:
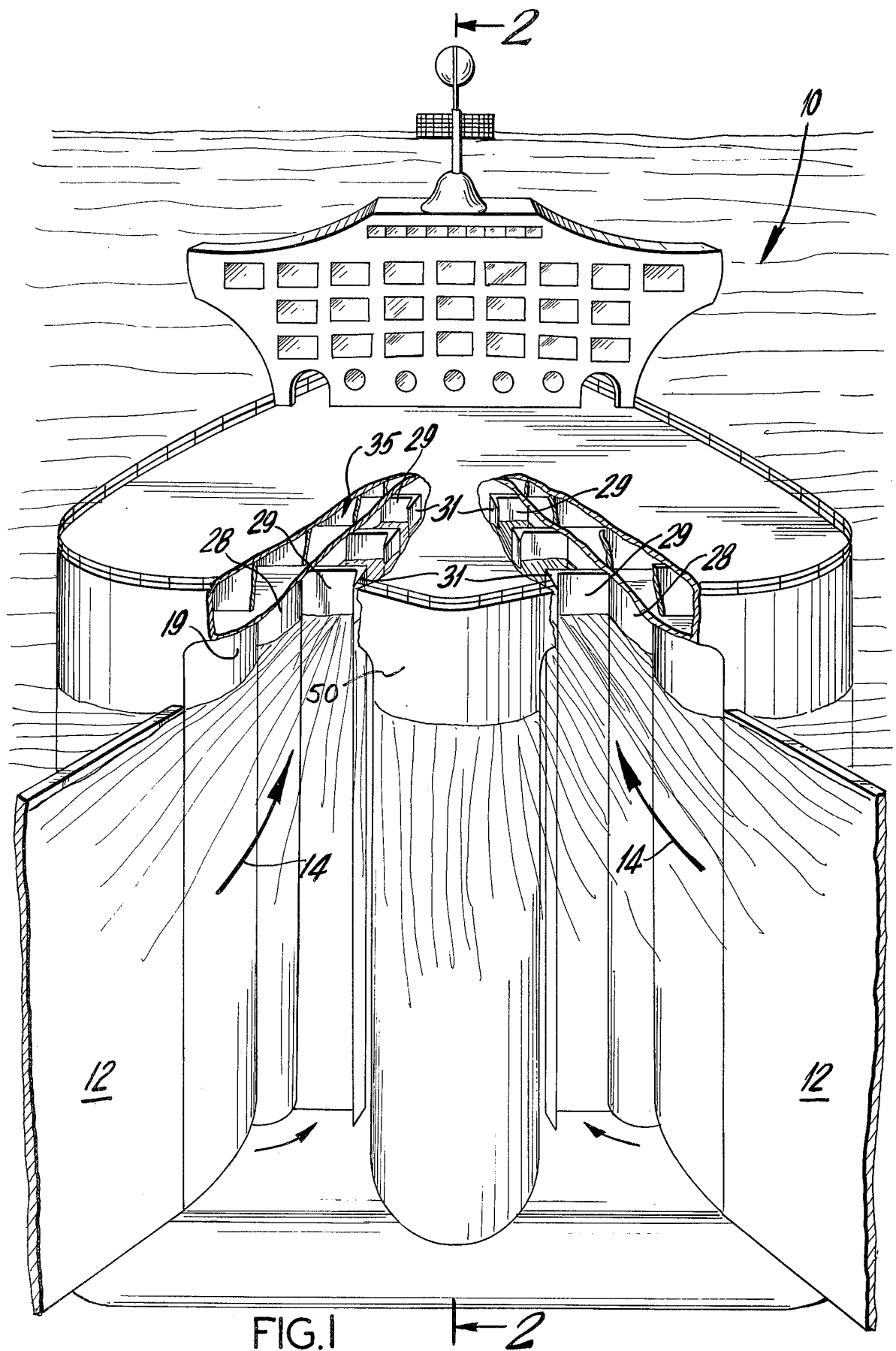
FIG. 1 is a perspective view of a typical energy ship including the power generator means of the present invention.

Referring now to the drawings, the invention comprises one or more generator ships 10 which are anchored to the sea floor 17 by a chain or anchor 11 with the ship 10 facing the current or tidal flow. If the tidal flow reverses, the ship 10 would of course turn to face the direction of flow. Plates 12 are held in position by flotation buoys 13 at the inlet 14 of the ship 10. The plates 12 extend outwardly from the inlet 14 of the ship 10 in a V-form in order to direct the current flow to said inlet 14. The angle of the V-form is generally about 45° but the angle can vary depending on the size and shape of the ship.

More specifically, the plates 12 are fastened to tubes 16 which maintain the plates 12 in a spaced relationship. The tubes 16 are mounted to the flotation buoys 13 at their upper end. The lower end of the tubes 16 is achored to the sea floor 17 by a chain 18. Thus, the water flow is directed to the inlet 14 in a funnel type arrangement which increases the pressure at the inlet 14. A typical arrangement might include two plates 12 extending outwardly on each side of the ship 10.

Figure 2:
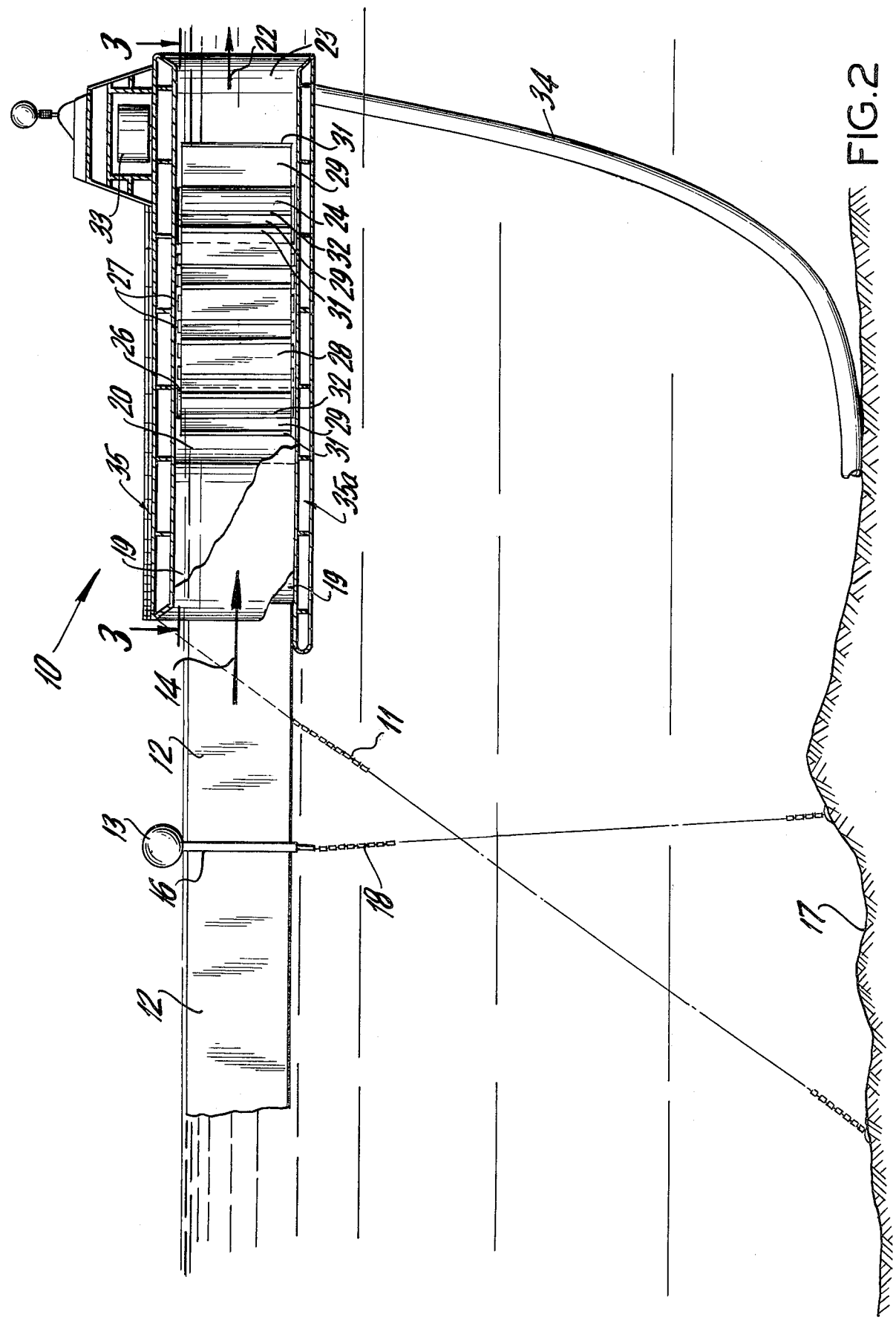
FIG. 2 is a longitudinal-section view of the generator ship taken along lines 2—2 of FIG. 1.
Figure 3:
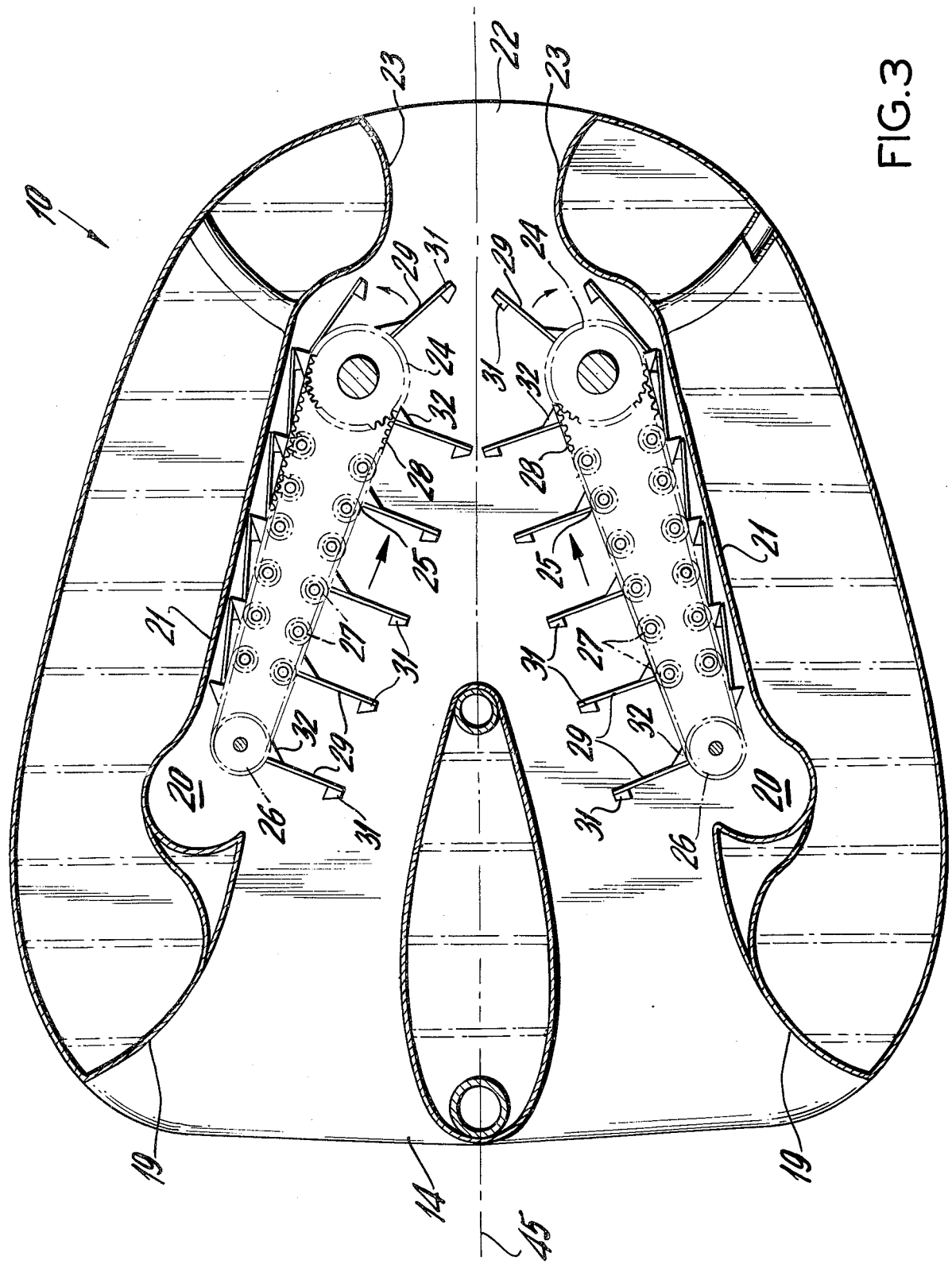
FIG. 3 is a cross-sectional view taken along the line 3—3 of FIG. 2.
Figure 4:
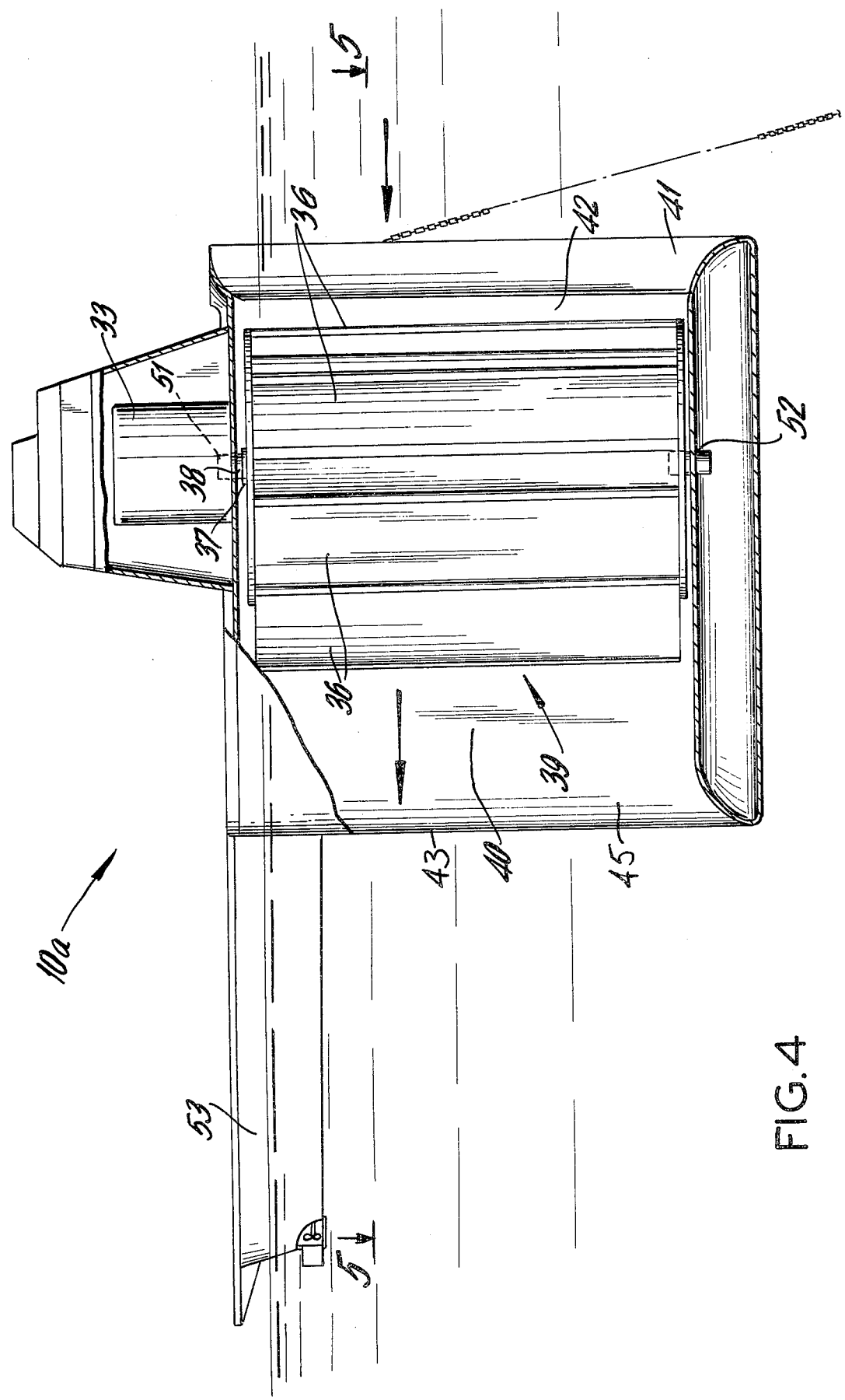
FIG. 4 is a longitudinal view through the center of the ship looking in the port direction of an alternate embodiment of the invention having a vertical water wheel.

As shown in greater detail in FIGS. 2 and 3, the inlet 14 comprises a rounded surface 19 on opposite walls thereof leading to an inwardly curved portion 20. The interior wall 21 then slopes inwardly converging toward the outlet 22. The sloping portion 21 leads to a rounded surface 23 which is narrower than the flared out 22. A thrust member 50 may be positioned along the center line 45 of the ship in order to direct the water flow towards the walls.

Mounted lengthwise along the wall portion 21 on each side of the ship 10 are a pair of vertical wheel members 24 and 26 with forward member 26 being somewhat smaller than the wheel member 24 located towards the outlet 22. The wheel members 24 and 26 are positioned between the curved portion 20 and the rounded surface 23. A plurality of small supporting wheel members 27 are spaced between the wheels 24 and 26 to support the toothed belt 28 which extends about toothed members 24 and 26. The belt 28 extends lengthwise substantially parallel to the surface 21.

A plurality of hinged blades 29 having projecting portions 31 at the outer end thereof are mounted on the belt 28. The blades 29 are hinged to the belt 28 at 25 and are supported in an extended position by blocks 32. Thus, the blades 29 are urged outwardly by the water pressure as the belt 28 moves about wheel 26 in the direction indicated on the drawings. As the blades circle about wheel 24 the pressure thereon is relieved and the blades 29 fold downwardly to minimize water resistance as they circle back to the forward wheel 26. The rotating wheel is coupled to conventional generating apparatus which is not described in detail herein. After driving the blades 29, the water leaves the ship 10 through outlet 22.

As is shown in the drawings, it is generally preferred to have two such units to balance the water flow in a typical ship 10. In FIG. 2, the generator unit 33 is shown mounted over the rear rollers 24 with the belts 28 usually extending substantially below the sea level. The belts 28 extend vertically downward between ship surfaces 35 and 35a. As mentioned previously, the belts 28 are engaged by toothed rollers 27 and main rollers 24 and 26 at each end. In FIG. 2, the generator power is transmitted over cable 34 to a shore station or stored in a conventional manner for later transfer if generated far off shore.

Figure 5:
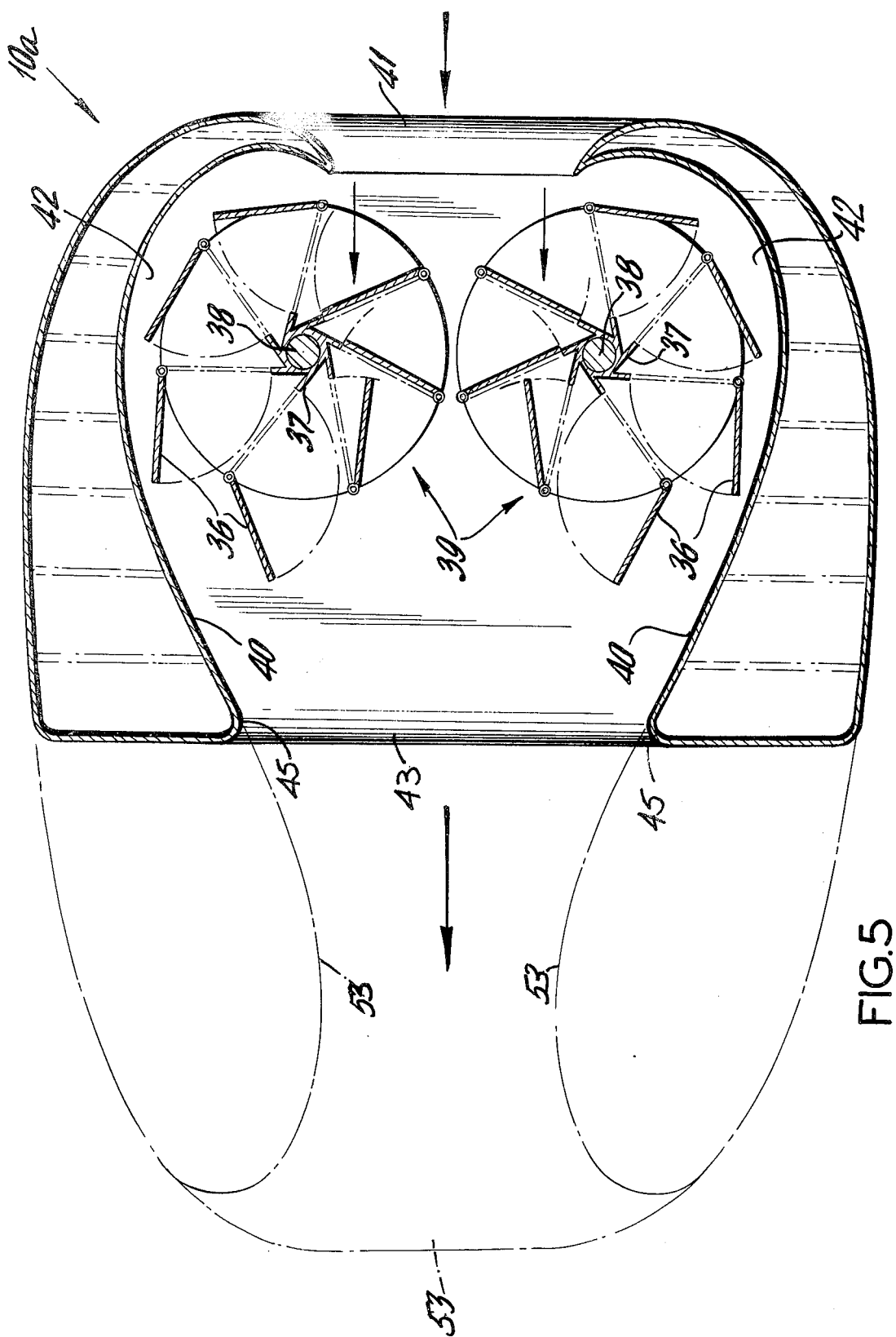
FIG. 5 is a cross-sectional view taken along the line 5—5 of FIG. 4.

FIGS. 4 to 7 showing alternate embodiments of the invention utilizing the particular water wheel 39 shown in FIG. 5 which includes a plurality of blades 36 hinged about the periphery of said wheel 39 and cooperating with members 37 which extend outwardly from the axis 38 of the wheels 39. Due to the pressure of the water flowing through inlet 41, the blades 36 pivot engaging member 37 adjacent to the inlet 41 of the ship 10a. As the wheels 39 rotate, the hinged blades 36 become disengaged from the member 37 and pivot outwardly therefrom to minimize water resistance as the wheels 39 rotate into the curved recessed portion 42. A pair of such wheels 39 may be mounted vertically opposite one another with approximately one-half of the wheel extending into a recessed portion 42 near the ship inlet 41. The interior wall 40 of the ship curves outwardly from the recessed portion 42 towards rounded portion 45 leading to the flared outlet 43 in order to maximize the water pressure available to turn the wheels 39. The wheels 39 are mounted in frictionless supports 52 at the lower end and are coupled to generator 33 at the upper end by means of coupling 51. The aft 53 of the ship 10a is conventional and hence will not be described in detail.

The wheels 39 may be horizontally mounted in tandem, as shown in the embodiment of FIG. 7, between a pair of generator ships 10b providing a catamaran effect with the bridge 44 extending between the pair of ships 10b. The wheels 39a shown in FIGS. 6 and 7 are mounted in a horizontal position whereas the wheels 39 shown in FIG. 5 are mounted in a vertical position.

In operation, the generator ship 10 is firmly anchored to the sea floor 17 to utilize the tidal flow of rivers, etc. or to utilize the flow of the gulf stream or other currents. The water is directed through the inlet 14 or 41 to drive either belts 28 or water wheels 38 or 39a through the medium of collapsible blades 29 and 36 respectively. The rotating blades are pivotal about their hinged mounting to minimize resistance as they rotate against the direction of the water flow and become outwardly extended as they enter the inlet portion and not engaged by the water flow. The rotating belts 28 or wheels 39 or 39a are coupled to conventional generating apparatus. This system thereby provides a very inexpensive source of power without the expenditures of huge sums on power plants and the like while not detracting in the least from the environment and pollution concerns.

It is to be understood that the above described arrangements are merely illustrative example of the application. Numerous other arrangements may be readily devised by those skilled in the art which will embody the principals of the invention and fall within the spirit and scope thereof.

What is claimed is:

1. In a water current power generator system including power generating means, the combination comprising:

a ship having an inlet and an outlet for the passage of water therethrough, a pair of water wheels mounted vertically within said inlet and in a juxtaposed position, each of said water wheels having a plurality of blades pivotally mounted and spaced about the periphery of said wheel, and a plurality of fixed radially extending members integrally formed about the axis of said water wheel wherein the blades pivot against said fixed radially extending members to form a rigid member as they encounter the water flow adjacent to the inlet and then pivot outwardly therefrom to minimize water resistance as the blades return to the inlet position, and, means coupling the water wheel to the power generator means.

2. A water current power generator system in accordance with claim 1 wherein:

the interior wall of the ship comprises an inwardly curved portion adjacent to the inlet, an intermediate inwardly curved portion extending lengthwise along the axis of the ship and an outwardly flared portion at the outlet.

* * * * *